(12) United States Patent
Montena

(10) Patent No.: US 8,579,520 B2
(45) Date of Patent: Nov. 12, 2013

(54) LATCHING OPTICAL DIGITAL AUDIO CONNECTOR AND METHOD OF USE THEREOF

(75) Inventor: Noah Montena, Syracuse, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 343 days.

(21) Appl. No.: 13/021,362

(22) Filed: Feb. 4, 2011

(65) Prior Publication Data
US 2012/0201498 A1 Aug. 9, 2012

(51) Int. Cl.
*G02B 6/36* (2006.01)

(52) U.S. Cl.
USPC .......................................................... 385/78

(58) Field of Classification Search
None
See application file for complete search history.

(56) References Cited

U.S. PATENT DOCUMENTS

| | | | |
|---|---|---|---|
| 5,073,042 A * | 12/1991 | Mulholland et al. | 385/69 |
| 5,129,023 A * | 7/1992 | Anderson et al. | 385/70 |
| 5,230,032 A | 7/1993 | Muzslay | |
| 5,274,729 A * | 12/1993 | King et al. | 385/134 |
| 5,809,192 A | 9/1998 | Manning et al. | |
| 6,454,464 B1 | 9/2002 | Nolan | |
| 6,464,408 B1 | 10/2002 | Nolan | |
| 6,554,487 B2 | 4/2003 | Nolan | |
| 6,913,396 B2 | 7/2005 | Nelson | |
| 2010/0164222 A1 | 7/2010 | Schreckenberg et al. | |

FOREIGN PATENT DOCUMENTS

| | | |
|---|---|---|
| CN | 201117952 Y | 9/2008 |
| JP | 1107482 A | 4/1989 |
| JP | 2004186057 A | 7/2004 |
| JP | 2005142035 A | 6/2005 |

\* cited by examiner

*Primary Examiner* — Sung Pak
(74) *Attorney, Agent, or Firm* — Hiscock & Barclay, LLP

(57) ABSTRACT

An optical digital audio connector including a ferrule radially disposed over an optical fiber, an outer shell, having a first end and a second end, disposed over the ferrule, the outer shell having an extension extending from the first end of the outer shell, wherein the outer shell and extension have at least one axial slot, the at least one axial slot starting proximate the second end of the shell and axially extending through the outer shell and extension to facilitate radial movement of the outer shell and the extension, and a latching feature structurally integral with the extension, wherein the latching feature is a ramped surface forming a peak, the peak raised a distance from the outer surface, is provided. Furthermore, an associated method is also provided.

20 Claims, 7 Drawing Sheets

LATCHING OPTICAL DIGITAL AUDIO CONNECTOR AND METHOD OF USE THEREOF

FIELD OF TECHNOLOGY

The following relates to an optical digital audio connector and more specifically to embodiments of a latching optical digital audio connector for retention with a corresponding jack.

BACKGROUND

Standard optical digital audio connectors are used for various applications, including home audio setups, such as connecting a CD/DVD player to a receiver. A secure connection between the optical digital audio connector and a corresponding jack is desired, and unwanted disengagement can be very frustrating. In the comfortable conditions of a household living room, the normal level of retention between the optical digital audio connector and a corresponding socket may be sufficient. However, in more rigorous conditions, such as a recording studio or live sound setup, where equipment can be jostled during use and connections can loosen during transport, a stronger level of retention between the connector plug and corresponding jack is required. Moreover, retrofitting existing jacks of installed electronic devices to allow for stronger retention would be costly and time consuming, and an unnecessary departure from the standard operability of the connection.

Thus, a need exists for an apparatus and method for a latching optical digital audio connector to increase the retention between the connector and the jack, while being backwards compatible with existing jacks.

SUMMARY

A first general aspect relates to an optical digital audio connector comprising a ferrule, having a first end and a second end, disposed over an optical fiber, an outer shell disposed over the ferrule, wherein the outer shell includes an extension which extends from a body of the outer shell, and at least one latching feature positioned on an outer surface of the outer shell, wherein the at least one latching feature has a raised profile configured to securably engage a corresponding receptacle.

A second general aspect relates to an optical digital audio connector comprising a ferrule radially disposed over an optical fiber, an outer shell, including a first end and a second end, disposed over the ferrule, the outer shell having an extension extending from the first end of the outer shell, wherein the outer shell and extension have at least one axial slot, the at least one axial slot starting proximate the second end of the shell and axially extending through the outer shell and extension to facilitate radial movement of the outer shell and the extension, and a latching feature structurally integral with the extension, wherein the latching feature is a ramped surface forming a peak, the peak raised a distance from the outer surface.

A third general aspect relates to a connector comprising a ferrule surrounding an optical fiber, and an outer shell disposed over the ferrule, the outer shell having an inner surface defined by a first inner diameter and a second inner diameter, wherein the first inner diameter is large enough to provide clearance between a thicker portion of the ferrule and the inner surface of the outer shell, and the second inner diameter being large enough to provide clearance between an annular detent of the ferrule and the inner surface of the outer shell, wherein the clearance allows deflection of the outer shell.

A fourth general aspect relates to an optical digital audio connector comprising a ferrule radially disposed over an optical fiber, and an outer shell, including a first end and a second end, radially disposed over the ferrule, the outer shell having an extension extending from the first end of the outer shell, wherein the outer shell and extension have at least one axial slot, the at least one axial slot starting proximate the second end of the shell and axially extending through the outer shell and extension to facilitate radial movement of the outer shell and the extension; and a means for securably engaging a corresponding receptacle.

A fifth general aspect relates to a method of securably latching an optical digital audio connector, comprising providing a ferrule, having a first end and a second end, disposed over an optical fiber, an outer shell disposed over the ferrule, wherein the outer shell includes an extension which extends from a body of the outer shell, and positioning at least one latching feature on an outer surface of the outer shell, wherein the at least one latching feature has a raised profile configured to securably engage a corresponding receptacle.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
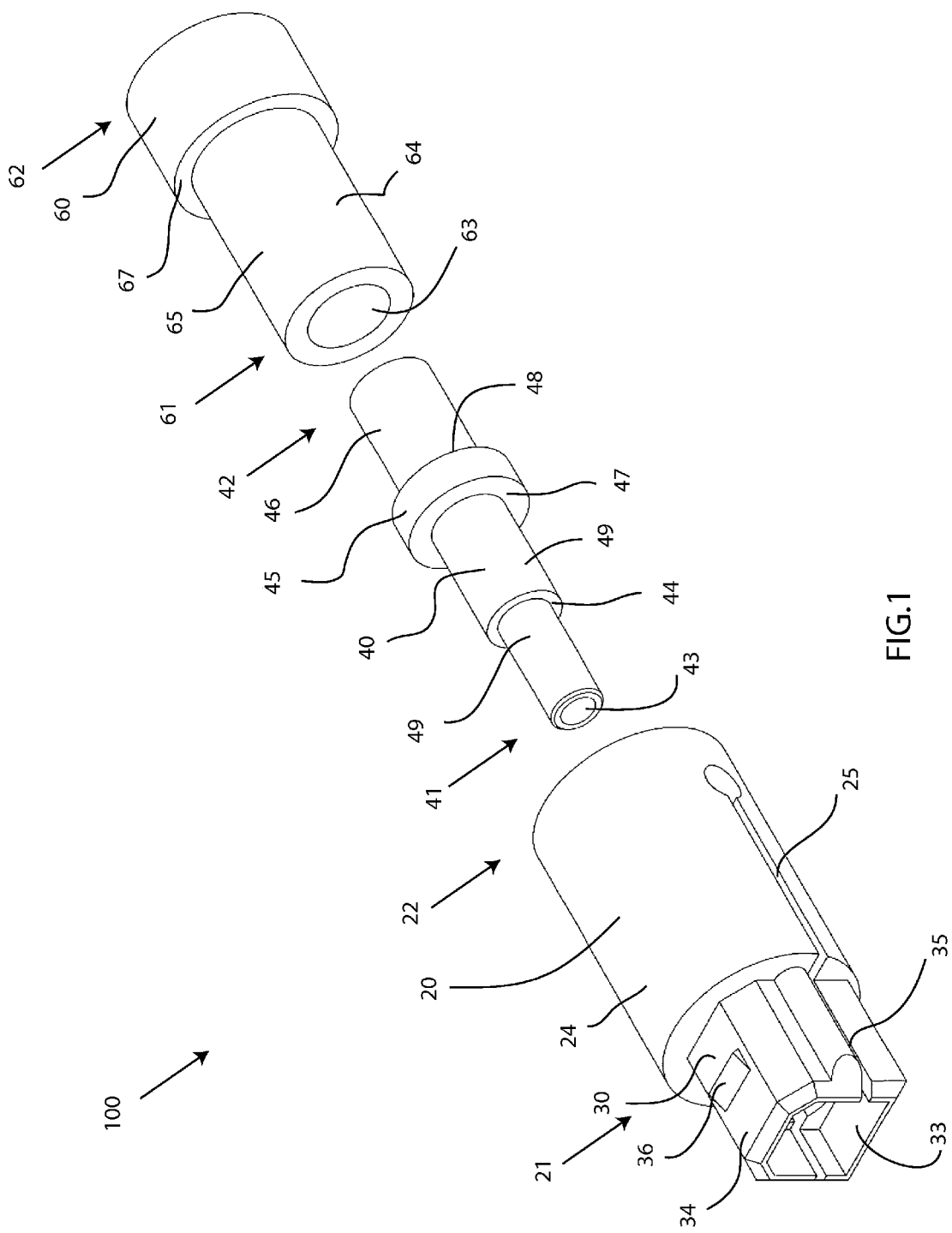
FIG. 1 depicts an exploded perspective view of an embodiment of an optical digital audio connector.

Referring to the drawings, FIG. 1 depicts an embodiment of an optical digital audio connector 100. Optical digital audio connector 100 may be a Sony/Phillips Digital Interconnect Format (S/P DIF), a TOSLINK®, optical connector, digital audio connector, digital optical connector, optical cable, or similar optical fiber connector used for various audio applications and audio equipment. Optical digital audio connector 100 can be designed to be inserted into a corresponding receptacle of an electronic device to transfer information and/or messages from the optical fiber 50 to the electronic device.

Embodiments of an optical digital audio connector 100 may include an optical fiber 50, an overmold 60, a ferrule 40, an outer shell 20 having an extension 30, and an optical fiber 50. In one embodiment, connector 100 may include a ferrule 40, having a first end 41 and a second end 42, disposed over an optical fiber 50, an outer shell 20 disposed over the ferrule 40, wherein the outer shell 20 includes an extension 30 which extends from a body 29 of the outer shell 20, and at least one latching feature 36 positioned on an outer surface 34 of the extension 30, wherein the at least one latching feature 36 has a raised profile configured to securably engage a corresponding receptacle 70. In another embodiment, the optical digital audio connector 100 may include a ferrule 40 radially disposed over an optical fiber 50, an outer shell 20, including a first end 21 and a second end 22, disposed over the ferrule 40, the outer shell 20 having an extension 30 extending from the first end 21 of the outer shell 20, wherein the outer shell 20 and extension 30 have at least one axial slot 25, 35, the at least one axial slot 25, 35 starting proximate the second end 22 of the shell 20 and axially extending through the outer shell 20 and extension 30 to facilitate radial movement of the outer shell 20 and the extension 30, and a latching feature 36 structurally integral with the extension 30, wherein the latching feature 36 is a ramped surface forming a peak 38, the peak 38 raised a distance from the outer surface 34 of the extension 30. In an alternative embodiment, connector 100 may include a ferrule 40 surrounding an optical fiber 50, and an outer shell 20 disposed over the ferrule 40, the outer shell 20 having an inner surface 23 defined by a first inner diameter, $d_1$, and a second inner diameter, $d_2$, wherein the first inner diameter, $d_1$, is large enough to provide clearance between a thicker portion 45 of the ferrule 40 and the inner surface 23 of the outer shell 20, and the second inner diameter, $d_2$, being large enough to provide clearance between an annular detent 49 of the ferrule 40 and the inner surface 23 of the outer shell 20, wherein the clearance allows deflection of the outer shell 20. In yet another embodiment, the connector 100 may include a ferrule 40 radially disposed over an optical fiber 50, and an outer shell 20, including a first end 21 and a second end 22, radially disposed over the ferrule 40, the outer shell 20 having an extension 30 extending from the first end 21 of the outer shell 20, wherein the outer shell 20 and extension 30 have at least one axial slot 25, 35, the at least one axial slot 25, 35 starting proximate the second end 22 of the shell 20 and axially extending through the outer shell 20 and extension 30 to facilitate radial movement of the outer shell 20 and the extension 30; and a means for securably engaging a corresponding receptacle 70, such as slotting the extension 30 and/or providing a latching feature 36 to engage a standard jack 70.

Referring still to FIG. 1, embodiments of an optical digital audio connector 100 may include an optical fiber 50. The optical fiber 50 may be similar to standard optical fiber used to transfer information and messages, such as those typically used in fiber-optic communications, or other application known to those having skill in the art. The optical fiber 50 may include a core, a cladding, a buffer coating, and a protective jacket. In most embodiments, the optical fiber 50 may be surrounded by the ferrule 40, the outer shell 20, and a portion of the overmold 60.

Referring again to FIG. 1, embodiments of an optical digital audio connector 100 may include an overmold 60. The overmold 60 may have a first end 61, a second end 62, an inner surface 63, and an outer surface 64. The overmold 60 may be a generally cylindrical member having a generally axial opening therethrough, generally defined by an inner diameter. In one embodiment, the overmold 60 may have an inner diameter sufficient to allow a portion of the ferrule 40 to be inserted and pass axially through the first end 61 a distance towards the second end 62. In another embodiment, the overmold 60 is radially disposed over a portion of the ferrule 40, proximate or otherwise near the second end 42 of the ferrule 40, and a portion of the optical fiber 50. In yet another embodiment, the overmold 60 surrounds, radially or otherwise, ferrule 40 and the optical fiber 50 of the digital optical audio connector 100. Proximate the first end 61 of the overmold 60 may be an annular recess 65. The outer annular recess 65 may share the same inner surface 63 and may have the same inner diameter as the overmold 60, but may have smaller outer diameter than the overmold 60. The differences in outer diameter of the overmold 60 may be defined by an annular lip 67. The annular lip 67 may be configured to make physical contact with a corresponding mating surface 28 of the outer shell 20. For instance, the annular lip 67 of the overmold 60 may abut, contact, communicate, border, touch, press against, and/or adjacently join with a mating surface, such as mating edge 28, of the outer shell 20. It should be recognized, by those skilled in the requisite art, that the overmold 60 may be formed of conductive or non-conductive rigid materials such as metals, hard plastics, polymers, composites and the like, and/or combinations thereof. Furthermore, the overmold 60 may be manufactured via casting, extruding, cutting, turning, drilling, injection molding, spraying, blow molding, component overmolding, combinations thereof, or other fabrication methods that may provide efficient production of the component.

With continued reference to FIG. 1, embodiments of an optical digital audio connector 100 may include a ferrule 40. The ferrule 40 may include a first end 41 and a second end 42, an inner surface 43, an outer surface 46, and may be a generally cylindrical member having a generally axial opening therethrough, generally defined by an inner diameter. In one embodiment, the ferrule 40 may have an inner diameter sufficient to allow an optical fiber 50 to be inserted and pass axially through the second end 42. In another embodiment, the ferrule 40 is radially disposed over a fiber optical core, such as optical fiber 50. In yet another embodiment, the ferrule 40 surrounds, radially or otherwise, the optical fiber 50 of the digital optical audio connector 100. Furthermore, the ferrule 40 may include a thicker portion 45 where the thickness of the ferrule 40 is greater than other sections of the ferrule 40. The thicker portion 45 has a first edge 47 and a second edge 48. The first and second edges 47, 48 may be perpendicularly aligned with the outer surface 46 of the ferrule 40, or may have any alignment or orientation that could provide a mating edge and/or surface for another component of the digital optical audio connector 100. For example, the first and second edges 47, 48 may form a right angle with the outer surface 46 of the ferrule 40, or be a tapered surface to accommodate different shaped or correspondingly tapered components. The first edge 47 may be configured to make physical contact with a corresponding mating surface 27 of an outer shell 20. For instance, the mating edge surface, such as first edge 47 of thicker portion 45 of the ferrule 40 may abut, contact, communicate, border, touch, press against, and/or adjacently join with a mating surface, such as mating edge 27, of the outer shell 20. Similarly, the second edge 48 may be configured to make physical contact with a corresponding mating surface 68 of the overmold 60. For instance, the mating edge surface, such as second edge 48 of thicker portion 45 of the ferrule 40 may abut, contact, communicate, border, touch, press against, and/or adjacently join with a mating surface, such as mating edge 68, of the overmold 60.

Furthermore, the thicker portion 45 of the ferrule 40 may be a raised portion, an annular extension, an oversized barrel portion, and the like, or may be a separate annular tubular member that tightly surrounds or generally substantially surrounds a portion of the ferrule 40, increasing the thickness of the ferrule 40 for that particular section. The thicker portion 45 may be located somewhere between the second end 42 and the recessed edge 44, the recessed edge 44 edge being proximate or otherwise near the annular detent 49. Alternatively, the thicker portion 45 may be positioned a distance away from the second end 42 to sufficiently accommodate and/or mate with the outer shell 20, depending on the size or desired location of outer shell with respect to the size and/or location of the ferrule 40. Moreover, the ferrule 40 should be formed such that the optical fiber 50 can pass axially into the second end 42 and/or through a portion of the tube-like body of the ferrule 40. Moreover, the ferrule 40 may be formed of a combination of both conductive and non-conductive materials. For example, a metal coating or layer may be applied to a polymer of other non-conductive material. Manufacture of the ferrule 40 may include casting, extruding, cutting, turning, drilling, knurling, injection molding, spraying, blow molding, component overmolding, or other fabrication methods that may provide efficient production of the component.

Figure 2:
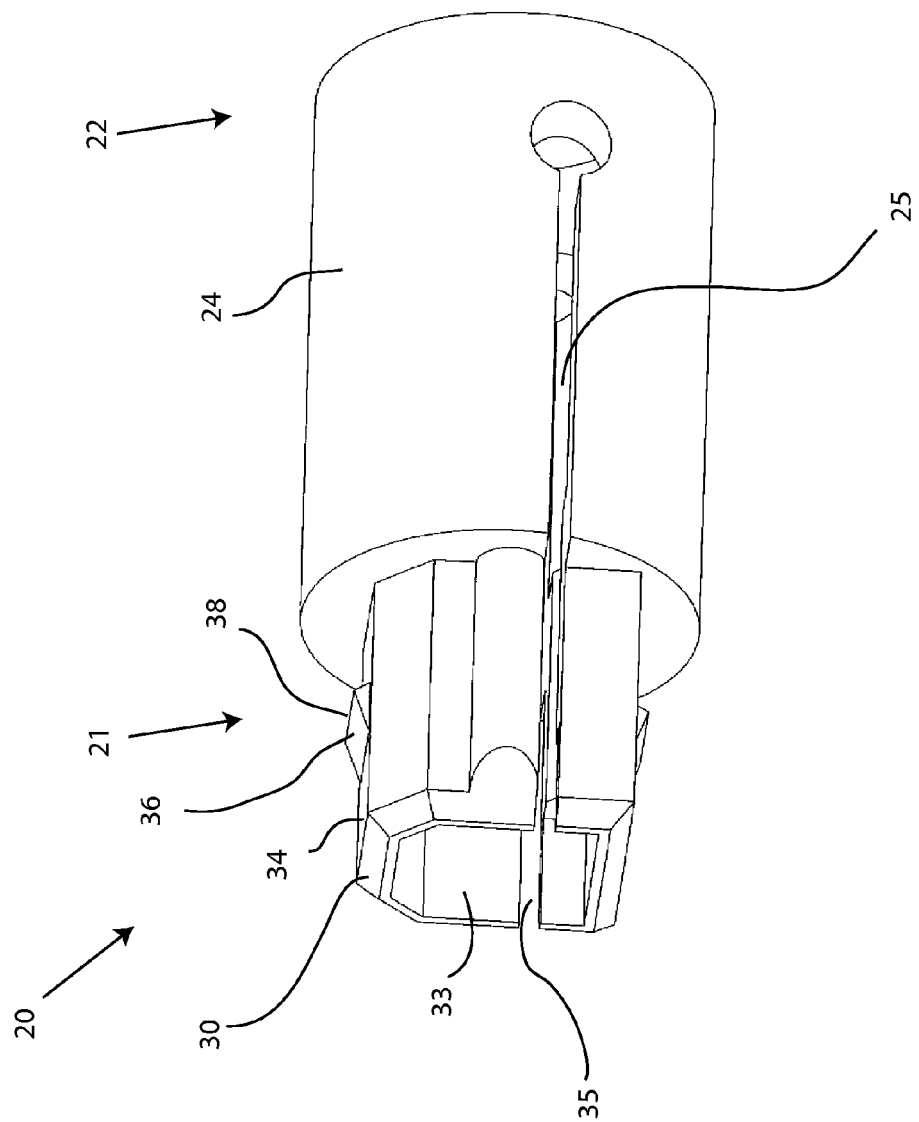
FIG. 2 depicts a perspective view of an embodiment of an optical digital audio connector.
Figure 3:
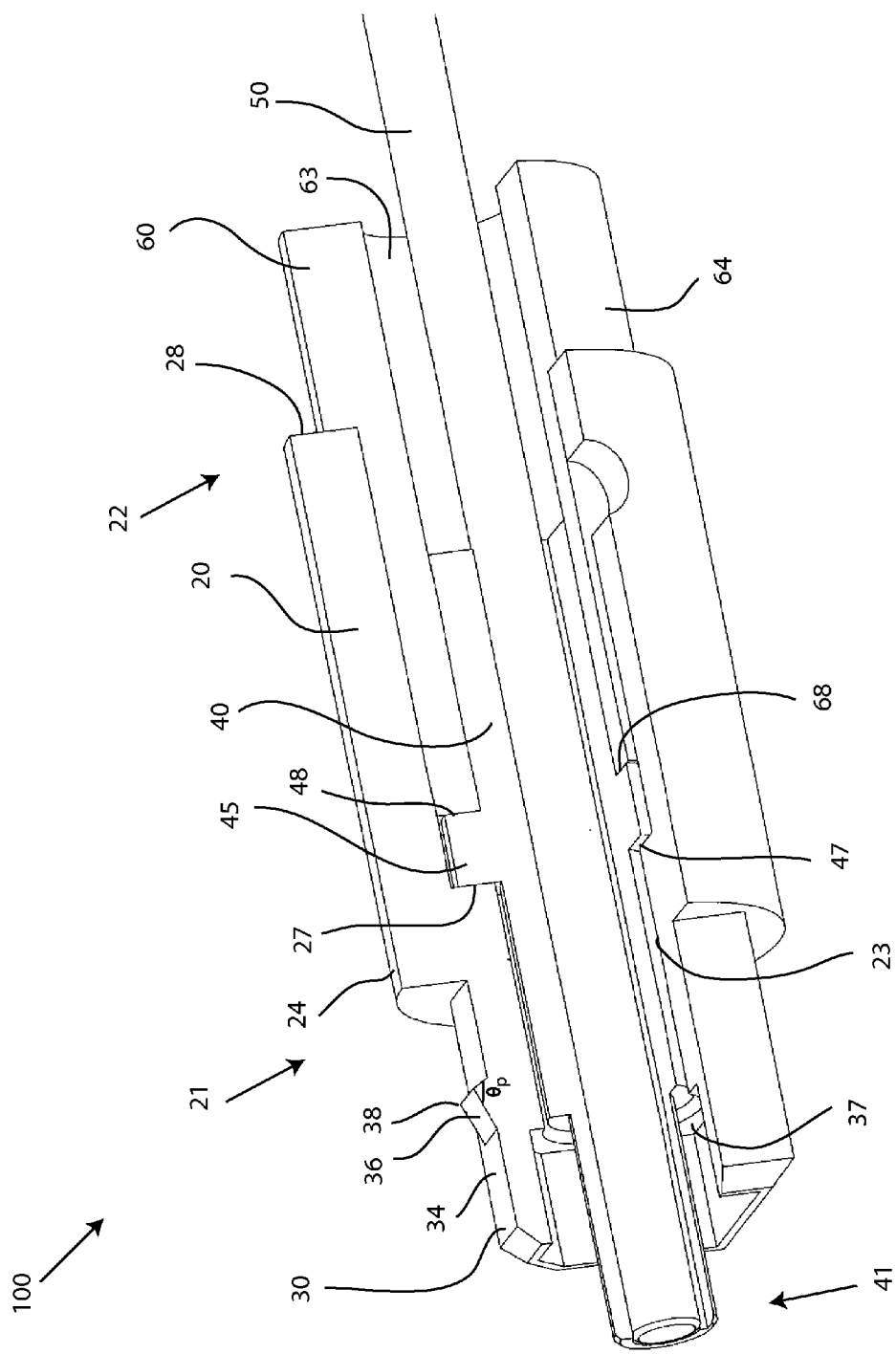
FIG. 3 depicts a partial cut-away view of an embodiment of an optical digital audio connector.

With continued reference to FIG. 1, and additional reference to FIGS. 2 and 3, embodiments of an optical digital audio connector 100 may include an outer shell 20. The outer shell 20 may include an extension 30; the extension 30 may be an integral extension of the outer shell 20. The outer shell 20 may have a first end 21, a second end 22, an inner surface 23, and an outer surface 24. The outer shell 20 can have a generally axial opening from the first end 21 to the second end 22. The generally axial opening may be defined by a first inner diameter, $d_1$, proximate or otherwise near the second end 22 and a second inner diameter, $d_2$, proximate or otherwise near the extension 30 of the outer shell 20. The first inner diameter, $d_1$, of the outer shell 20 may be large enough to allow the overmold 60, or a portion thereof, the ferrule 40, or a portion thereof, and the optical fiber 50, or a portion thereof, to pass axially through the second end 22, or dimensioned such that the overmold 60 disposed over the ferrule 40 may reside substantially within the outer shell 20 proximate or otherwise near the second end 22. Moreover, the outer shell 20 may include a mating surface 27. The mating surface 27 may be an internal lip, edge, annular protrusion located within the generally axial opening of the outer shell 20. The mating surface 27 may engage the first edge 47 of the thicker portion 45 of the ferrule 40, while operably configured (i.e. when fully assembled and functioning accordingly). The mating surface 27, or internal lip, may be an annular edge or surface that can define the size difference between the first inner diameter, $d_1$, and the second inner diameter, $d_2$, of the outer shell 20. For example, if the outer shell 20 includes an internal mating surface 27, the first inner diameter, $d_1$, of the outer shell 20 will be larger than the second inner diameter, $d_2$, of the outer shell 20. The first inner diameter, $d_1$, should also be large enough to provide sufficient clearance between the inner surface 23 of the outer shell 20 and the inner components of the optical digital audio connector 100. For example, the first inner diameter, $d_1$, should be large enough to provide clearance between the inner surface 23 and the ferrule 40, in particular, the thicker portion 45 of the ferrule 40, and possibly a portion of the overmold 60, to allow inward radial movement of the outer shell 20 when compressed (e.g. radially compressed). The second inner diameter, $d_2$, of the outer shell 20, proximate the extension 30, should be large enough to provide sufficient clearance between the inner surface 23 of the outer shell 20 and the ferrule 40, in particular, the annular detent 49 of the ferrule 40 to allow inward radial movement of the outer shell 20 when compressed (e.g. radially compressed).

Furthermore, proximate or otherwise near the first end 21, the outer shell 20 may include an extension 30 which may extend a distance from the body 29 of the outer shell 20. In most embodiments, the extension 30 extends an axial or lateral distance from the body 29 of the outer shell 20. The extension 30 may be structurally integral with the outer shell 20, such that the outer shell 20 and the extension 30 may be a single component. Additionally, the extension 30 may be generally polygonal, having an internal pathway to accommodate a portion of the optical fiber 50 and a portion of the ferrule 40; the optical fiber 50 and the first end 41 of the ferrule 40 may axially extend or pass through the entire length of the extension 30. The extension 30 should be sized and dimensioned such that the extension 30 can be inserted into a standard optical digital jack 70, and generally interact, engage, physically contact, etc., the corresponding standard optical digital jack 70. For instance, the extension 30 may be configured to engage the internal components of the jack 70, such as internal detents, cavities, walls, protrusions and the like. A standard corresponding jack 70, or receptacle, may receive or accept the optical digital audio connector 100, in particular, the extension 30 of the outer shell 20 of the digital audio connector 100. Furthermore, the extension 30 may include an internal lip 37 that extends a distance from the inner surface 33. The internal lip 37 may be located proximate the recessed edge 44 of the ferrule 40, while assembled or operably configured.

Moreover, the extension 30 may include an inner surface 33 and an outer surface 34. Located on the outer surface 34 of the extension 30 can be at least one latching feature 36. Embodiments of connector 100 may include a first latching feature 36 positioned on the outer surface 34 of a top side of the extension 30, and another latching feature 36 positioned on the outer surface 34 of a bottom side of the extension 30. A latching feature 36 may be a bump, protrusion, peak, ramp, wedge, engagement feature, similar surface feature, or a combination thereof, that raises up or away a distance from the outer surface 34 to make contact, securably engage, etc., with a corresponding jack 70. The latching feature 36 may be defined by a ramped surface with a raised profile and sharpened edges. For example, the latching feature 36 may have a steep or precipitous profile, wherein a peak 38 of the latching feature 36 forms a sharp, generally unblunted edge to engage one or more internal component(s) of a corresponding jack 70. In other words, the latching feature 36 may have a peak angle, $\theta_p$, which may define the slope(s) of the latching feature 36, or may define a profile of the latching feature 36. The more acute the peak angle, $\theta_p$, the steeper and/or more raised the profile of the latching feature 36 may become. In many embodiments, the peak angle, $\theta_p$, may be between 120° and 65°. The latching feature 36 may provide more secure retention force with a corresponding jack 70, due to the raised profile and sharp edges which may increase the amount of deflection needed to provide clearance for the extension to disengage from the jack 70. Unwanted deflection or compression of the connector 100 may occur during transport or with use in a rigorous environment (e.g. the connector is jostled and/or pulled). In addition, the latching feature 36 having a raised profile and sharpened edge, etc., may also increase the physical interference with the jack 70, which may further prevent unwanted disengagement from the jack 70. The latching feature 36 can be structurally integral with the extension 30, or may physically touch the outer surface 34 of the extension 30, such that there may be no space or clearance between the latching feature 36 and the outer surface 34. The latching feature 36 being structurally integral with the extension 30 or being flush with the outer surface 34 of the extension may provide firm contact or engagement with the jack 70, or internal components of a corresponding jack 70. For instance, the latching feature 36 may physical contact an internal mating edge 78 of the receptacle. Embodiments of the extension 30 may have a single latching feature 36. Further embodiments of the extension 30 may have more than one latching feature 36, for example, two latching features 35 side-by-side, or otherwise proximate configuration.

Figure 4:
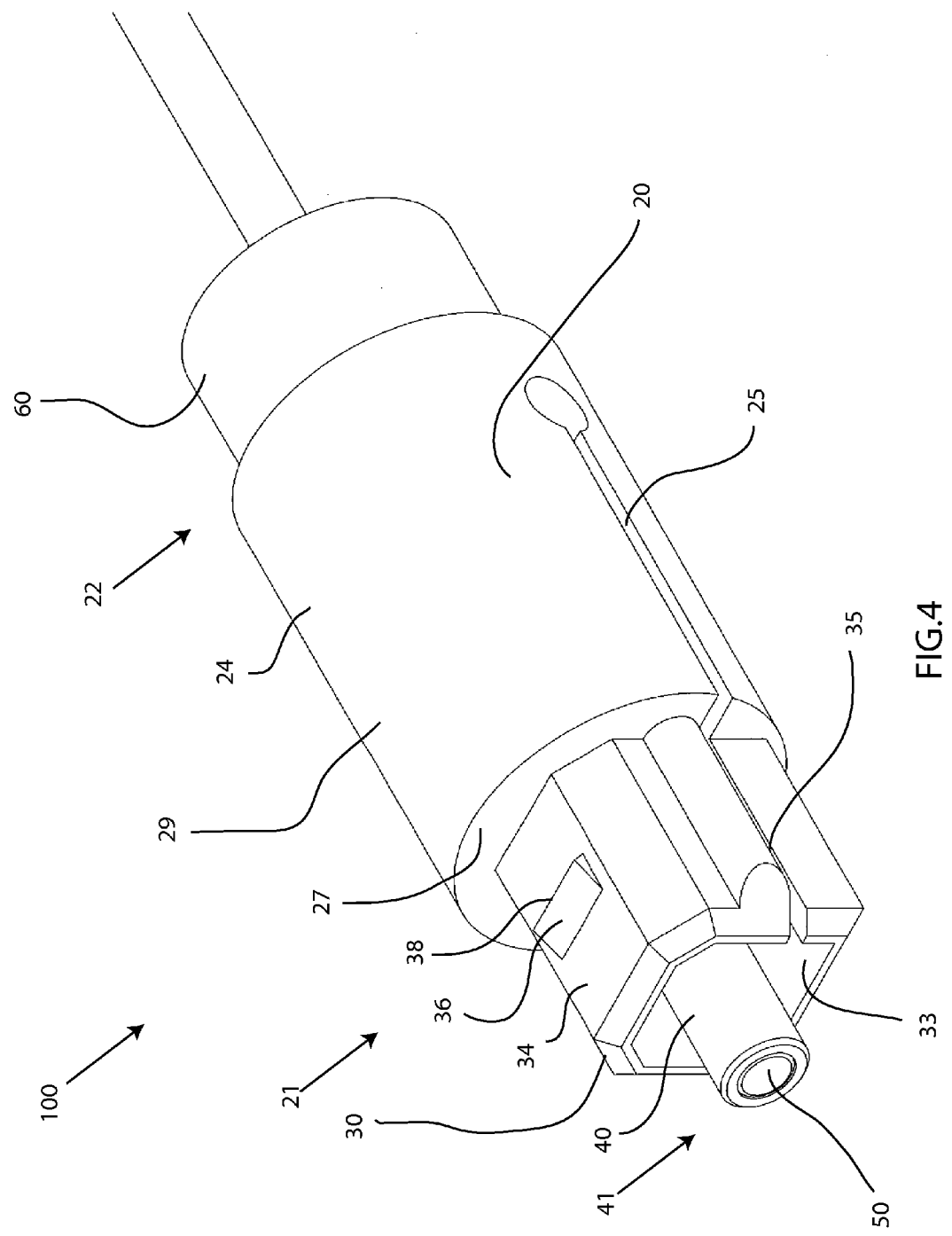
FIG. 4 depicts a perspective view of an embodiment of an optical digital audio connector.

Referring still to FIGS. 1-3, the outer shell 20 and the extension 30 may include at least one slot 25, 35 to facilitate radial movement of the outer shell 20 and extension 30. For instance, an embodiment of an optical digital audio connector 100 may include an outer shell 20 having an extension 30, wherein more than one axial slot 25, 35 is positioned on the outer shell 20 and the extension 30, as depicted in FIG. 2. In other embodiments, a single axial slot 25, 35 is positioned along the outer shell 20 and extension 30, as depicted in FIG. 4. The extension slot 35 and the outer shell slot 25 (i.e. slots 25, 35) can be the same, continuous axial slot starting from a position on the outer shell 20 and extending through the extension 30. The slots 25, 35 of the outer shell 20 and extension 30 may be axial openings that extend from proximate or otherwise near the second end 22 of the outer shell 20 through the extension 30. The slots 25, 35 may be openings, spaces, voids, apertures, holes, cuts, channels, grooves, and the like, positioned along the extension 30, and a portion of the outer shell 20 from proximate or otherwise near the second end 22 of the outer shell 20. For instance, the slots 25, 35 can be axially aligned with the outer shell 20 and the extension 30; moreover, the slots 25, 35 can axially extend through the extension 30 from proximate or otherwise near the second end 22 of the outer shell 20. In many embodiments, the precise starting location of the axial slot 25 of the outer shell 20 may vary, depending on the amount of deflection sought when compressed. For example, the closer the axial slot 25 starts/reaches the second end 22 of the outer shell, the greater the deflection of the connector 100, in particular, the outer shell 20 and extension 30.

Figure 5A:
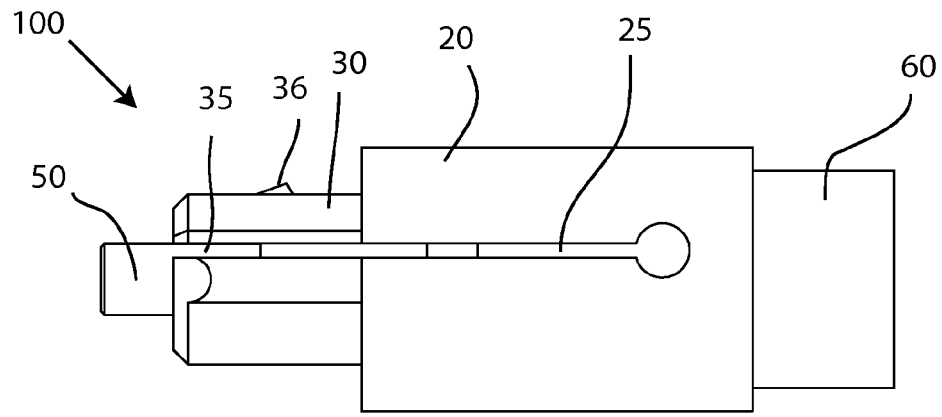
FIG. 5A depicts a side view of an embodiment of an optical digital audio connector having a slot proximate an upper portion of the shell and extension.
Figure 5B:
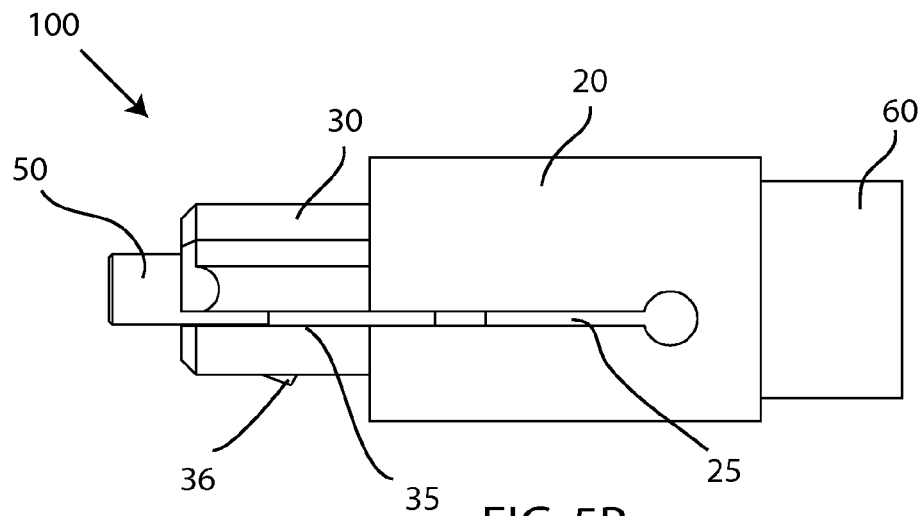
FIG. 5B depicts a side view of an embodiment of an optical digital audio connector having a slot proximate a middle portion of the shell and extension.
Figure 5C:
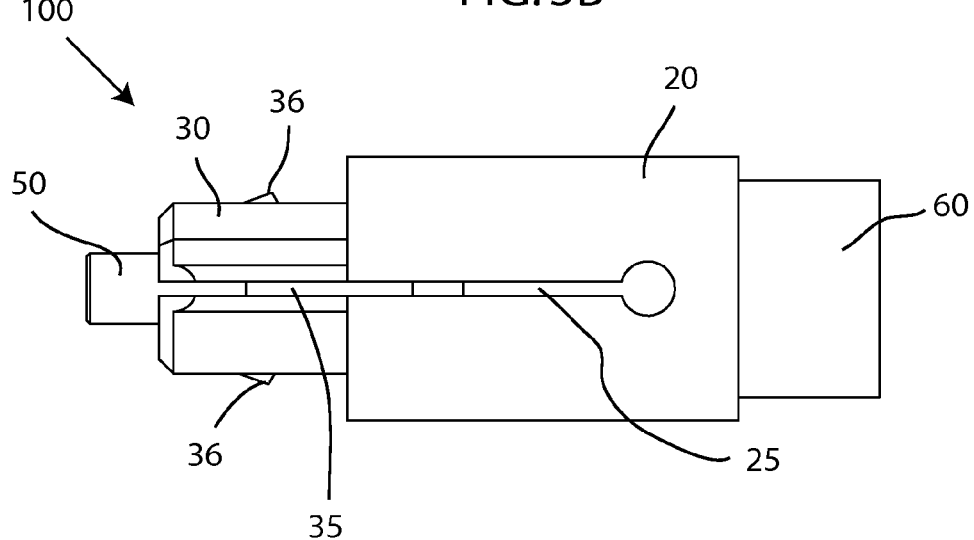
FIG. 5C depicts an side view of an embodiment of an optical digital audio connector having a slot proximate a lower portion of the shell and extension.

Similarly, the deflection may be affected by the placement of the slots 25, 35 with respect to the shell 20 body and extension body 30, as depicted in FIGS. 5A-5C. FIG. 5A shows an embodiment of connector 100 having slot 25, 35 proximate an upper portion of the shell 20 and extension 30. FIG. 5B shows an embodiment of connector 100 having slot 25, 35 proximate a middle portion of the shell 20 and extension 30. FIG. 5C shows an embodiment of connector 100 having slot 25, 35 proximate a lower portion of the shell 20 and extension 30. Furthermore, the width of the slots 25, 25 may vary based upon generally recognized parameters corresponding to broadband communication standards and/or equipment. One having ordinary skill in the art should also consider the structural properties of the materials used to manufacture the outer shell 20, the extension 30, and other connector 100 components, such as the modulus of elasticity of the material, ductility, yield strength, and the like, to determine the dimensions (i.e. length, width, depth) and the number of slots 25, 35 positioned on the connector 100. Ostensibly, the slots 25, 35 have a depth equal to the thickness of the outer shell 20 and extension 30, respectively (i.e. from the inner surface 23 of the outer shell 20 to outer surface 24 of the outer shell 20; from the inner surface 33 of the extension 30 to the outer surface 34 of the extension 30). In other words, the slots 25, 35 can be spaces where portions of the outer shell 20 and extension 30 have been removed, extruded, cut, extracted, etc.

Referring still to FIGS. 1-3, slotting the outer shell 20 and extension 30 makes it resilient in the radial direction, achieving deflection. For example, the outer shell 20, including the extension 30 may flex, deflect, move, bend, etc., in a radially outward direction and a radially inward direction. The slots 25, 35 allow the outer shell 20 and extension 30 to radially compress (i.e. radially inward direction), from an initial position of rest, when subjected to an external force, such as a user/person squeezing the connector 100 to remove it from a corresponding jack 70 or receptacle, or the physical contact between an internal component of a corresponding jack 70 and the latching feature 36 when inserting the connector 100 into the jack 70. For instance, the operable insertion of the extension 30 into a jack 70 may slightly compress the extension 30 and outer shell 20 in a radially inward direction via the physical contact being made between an internal wall or surface of a corresponding jack 70 and the latching feature 36, until the latching feature 36 reaches an internal detent or space within the jack 70 to return to the initial position. The deflection, or movement, of the extension 30 and outer shell 20 in a radially inward direction based on any compression need not be significant or readily apparent. For example, a slight deflection of the extension 30 and the outer shell 20 in a radially inward direction is sufficient to provide clearance for the latching feature 36 to be removed from the corresponding jack 70, or receptacle.

Figure 6:
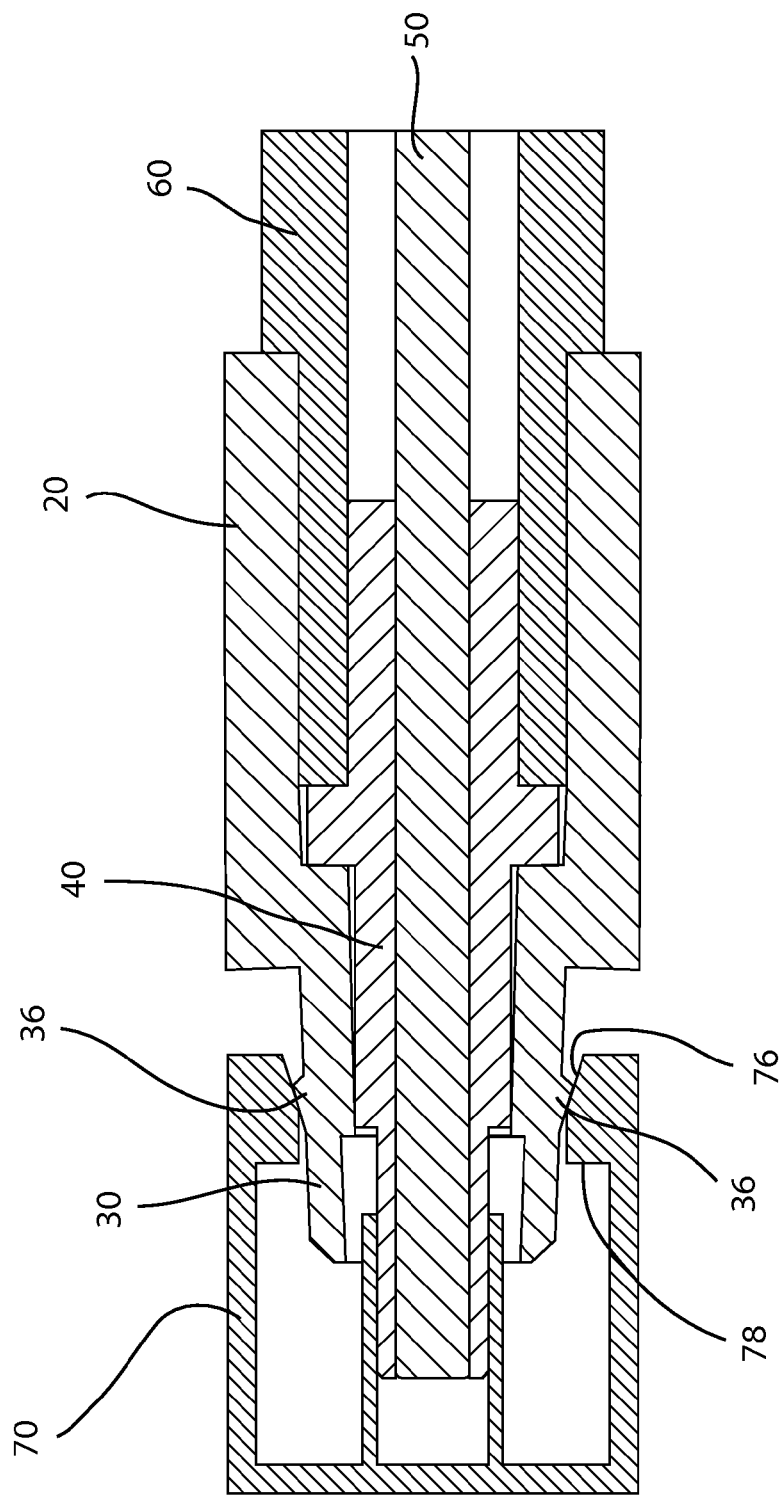
FIG. 6 depicts a cross-section view of an embodiment of an optical digital audio connector partially mated with a corresponding jack.
Figure 7:
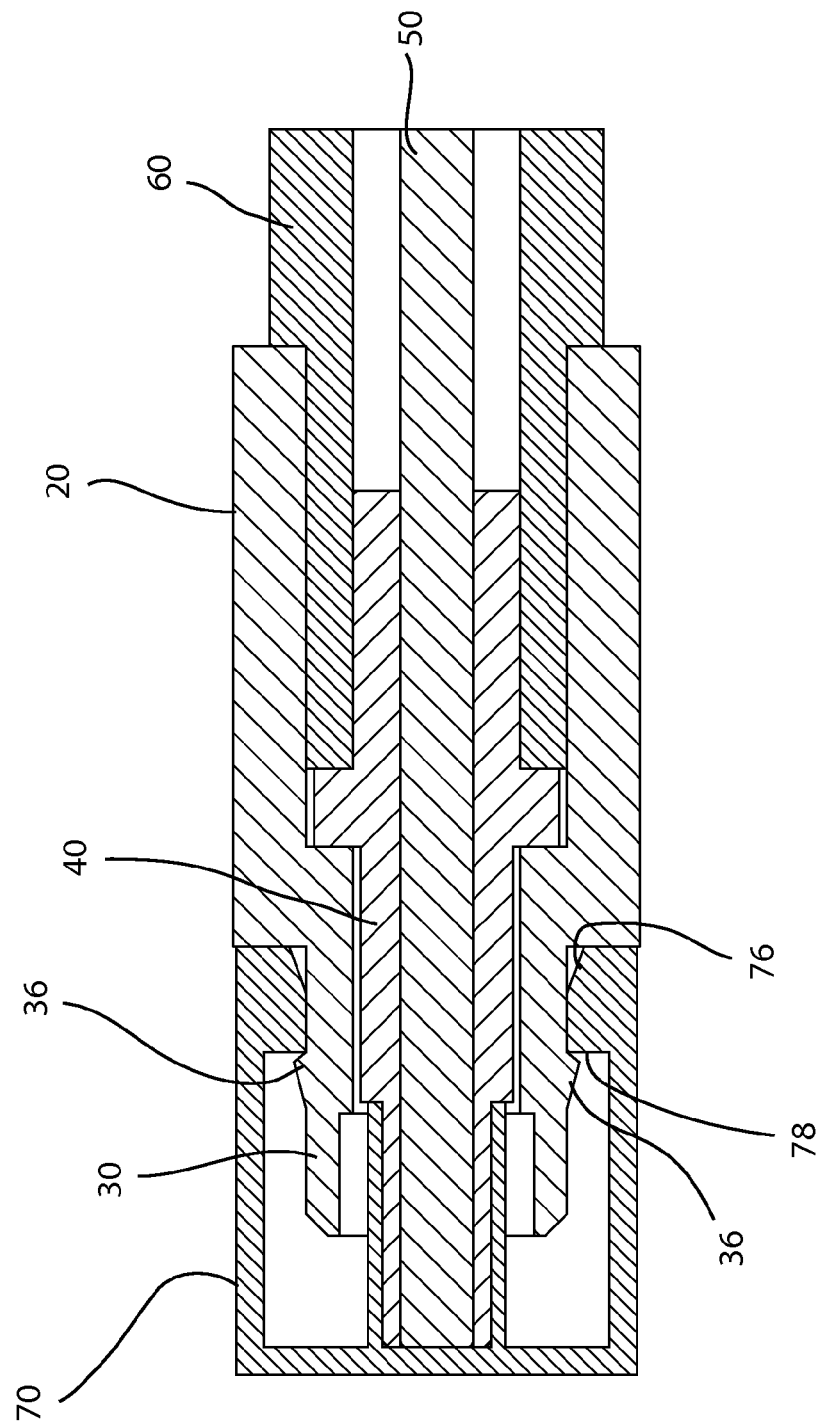
FIG. 7 depicts a cross-section view of an embodiment of an optical digital audio connector securably engaged to a corresponding jack.

With reference to FIGS. 6 and 7, an embodiment of an optical digital audio connector 100 may securably engage a corresponding jack 70, or receptacle. FIG. 6 depicts an embodiment of the optical digital audio connector 100 partially mated with a corresponding receptacle 70. The latching feature(s) 36 may initially engage the receptacle 70, in particular, front edge 76. FIG. 7 depicts an embodiment of connector 100 securably engaging a corresponding receptacle 70. The connector 100 removably securably engages a jack 70 by disposing at least one latching feature 36 on an extension 30 of an outer shell 20, wherein the latching feature 36 has a raised profile and sharpened edges, while permitting greater deflection of the shell 20 and the extension 30 through implementing at least one slot 25 in the body 29 of the outer shell and extension 30 and providing additional internal clearance between the outer shell 20 and the internal components, such as the ferrule 40. To secure the connector 100 into a corresponding jack 70, a user may simply push, or axially insert, the connector 100 into the jack 70 a distance until the extension 30 fully mates with the jack 70 and the latching feature 36 has fully engaged with the internal component(s) of the jack 70. For example, the outer shell 20 (and extension 30) may deflect (i.e. radially compressed in a radially inward direction) upon entering the jack 70, based on physical contact between the integral latching features 36 and an internal surface, such as the internal mating edge 78 of the jack 70. After continued insertion an axial distance into the jack 70, the latching feature 36 will reach detents or voids within the jack 70, causing the outer shell 20 (and extension 30) to return to an initial position (i.e. radially outward movement). Once fully mated, the latching feature 36 will prevent unwanted movement of the connector 100 in the axial direction away from the jack 70 because of the mechanical interference between the latching feature 36 and an internal wall, such as internal mating edge 78, of the detent or void in the jack 70. To release the connector 100 from the jack 70, a user may squeeze the body 29 of the outer shell 20 to cause sufficient deflection of the shell 20 (i.e. radially inward movement) to provide clearance for the latching feature 36 and extension 30. To further improve or supplement retention security, embodiments of connector 100 may include a sliding lock or internal support.

Referring now to FIGS. 1-7, a method of latching an optical digital audio connector 100 to a corresponding jack 70 may include the steps of providing a ferrule 40, having a first end 41 and a second end 42, disposed over an optical fiber 50, an outer shell 20 disposed over the ferrule 40, wherein the outer shell 20 includes an extension 30 which extends from a body 29 of the outer shell 20, and positioning at least one latching feature 36 on an outer surface 34 of the extension 30, wherein the at least one latching feature 36 has a raised profile configured to securably engage a corresponding receptacle 70. The method of latching an optical digital audio connector 100 to a corresponding jack 70 may further include the steps of slotting the body 29 of the outer shell 20 and the extension 30 to permit deflection of the outer shell body 29, and providing an internal clearance between the ferrule 40 and an inner surface 23 of the outer shell 20 and an inner surface 33 of the extension 30 to permit additional deflection of the outer shell 20 and extension 30. Moreover, the method may include an overmold 60 radially disposed over a portion of the ferrule 40 proximate the second end 42 of the ferrule 40. The at least one latching feature 36 may have sharpened edges to increase mechanical interference with the jack 70, or receptacle.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A optical digital audio connector comprising:
a ferrule, having a first end and a second end, disposed over an optical fiber;
an outer shell disposed over the ferrule, wherein the outer shell includes an extension which extends from a body of the outer shell; and
at least one latching feature positioned on an outer surface of the outer shell, wherein the at least one latching feature has a raised profile configured to initially engage a front edge of a corresponding receptacle and then securably engage an internal mating edge of the corresponding receptacle.

2. The optical digital audio connector of claim 1, further including: an overmold radially disposed over a portion of the ferrule proximate the second end of the ferrule.

3. The optical digital audio connector of claim 1, wherein the at least one latching feature has sharpened edges to increase mechanical interference with the receptacle.

4. The optical digital audio connector of claim 1, wherein the at least one latching feature is a protrusion having a ramped surface.

5. The optical digital audio connector of claim 1, wherein the outer shell includes at least one slot to permit deflection of the body of the outer shell.

6. A optical digital audio connector comprising:
a ferrule radially disposed over an optical fiber;
an outer shell, including a first end and a second end, disposed over the ferrule, the outer shell having an extension extending from the first end of the outer shell, wherein the outer shell and extension have at least one axial slot, the at least one axial slot starting proximate the second end of the shell and axially extending through the outer shell and extension to facilitate radial movement of the outer shell and the extension; and
a latching feature structurally integral with the extension, wherein the latching feature is a ramped surface forming a peak, the peak raised a distance from the outer surface;
wherein the extension is configured to be axially inserted within a corresponding receptacle.

7. The optical digital audio connector of claim 6, wherein the latching feature includes a peak angle, the peak angle defining a profile of the latching feature.

8. The optical digital audio connector of claim 7, wherein the peak angle is between 120° and 65°.

9. The optical digital audio connector of claim 6, further including: an overmold radially disposed over a portion of the ferrule.

10. A connector comprising:
a ferrule surrounding an optical fiber; and
an outer shell disposed over the ferrule, the outer shell having an inner surface defined by a first inner diameter and a second inner diameter, wherein the first inner diameter is large enough to provide clearance between a thicker portion of the ferrule and the inner surface of the outer shell, and the second inner diameter being large enough to provide clearance between an annular detent of the ferrule and the inner surface of the outer shell;
wherein the clearance allows deflection of the outer shell;
wherein the outer shell includes an extension having a bump on an outer surface of the extension, the bump being located a distance from an end of the extension.

11. The connector of claim 10, wherein the first inner diameter is larger than the second inner diameter.

12. The connector of claim 10, further including an overmold radially disposed over a portion of the ferrule.

13. The connector of claim 10, wherein the clearance allows radially inward movement of the outer shell to release the connector from a corresponding jack.

14. An optical digital audio connector comprising:
a ferrule radially disposed over an optical fiber; and
an outer shell, including a first end and a second end, radially disposed over the ferrule, the outer shell having an extension extending from the first end of the outer shell, wherein the outer shell and extension have at least one axial slot, the at least one axial slot starting proximate the second end of the shell and axially extending through the outer shell and extension to facilitate radial movement of the outer shell and the extension; and
a means for securably engaging an internal mating edge of a corresponding receptacle, wherein the means includes a ramped portion located a distance from the second end of the extension.

15. A method of securably latching an optical digital audio connector, comprising:
- providing a ferrule, having a first end and a second end, disposed over an optical fiber, an outer shell disposed over the ferrule, wherein the outer shell includes an extension which extends from a body of the outer shell; and
- positioning at least one latching feature on an outer surface of the outer shell, wherein the at least one latching feature has a raised profile configured to securably engage an internal mating edge of a corresponding receptacle.

16. The method of claim 15, further comprising:
- slotting the body of the outer shell and the extension to permit deflection of the outer shell body; and
- providing an internal clearance between the ferrule and an inner surface of the outer shell an inner surface of the extension to permit additional deflection of the outer shell and extension.

17. The method of claim 15, further including: an overmold radially disposed over a portion of the ferrule proximate the second end of the ferrule.

18. The method of claim 15, wherein the at least one latching feature has sharpened edges to increase mechanical interference with the receptacle.

19. The method of claim 15, wherein the at least one latching feature is a protrusion having a ramped surface.

20. The method of claim 15, wherein the latching feature includes a peak angle, the peak angle defining a profile of the latching feature.

* * * * *